K. E. PEILER

Aug. 19, 1930. BAR SPLICE FOR WOVEN WIRE FABRICS Re. 17,774

Original Filed Feb. 25, 1927

Witness:
James J. White

Inventor
Karl E. Peiler
by Robert A. Brown
Attorney

Reissued Aug. 19, 1930 Re. 17,774

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

BAR SPLICE FOR WOVEN-WIRE FABRICS

Original No. 1,675,276, dated July 26, 1928, Serial No. 170,754, filed February 25, 1927. Application for reissue filed April 30, 1930. Serial No. 448,744.

My invention relates to sectional woven-wire fabrics, and its object is to provide novel and effective means for connecting the panels or sections of conveyor belts formed of sections composed of intermeshing helical wires of right-hand twist alternating with sections composed of intermeshing helical wires of left-hand twist.

Conveyor belts composed of woven-wire fabric are frequently made in sections alternately of right and left-hand twist so as to avoid the tendency of such a conveyor to creep laterally upon its supports when in use. According to my present invention, I join the edges of such sections together by means of a bar or strip of metal or other suitable material having a series of perforations adapted to engage the convolutions of a right-hand wound helical wire and another series of perforations adapted to engage the convolutions of a left-hand helical wire. The perforations of the two series are preferably staggered with respect to one another so as to maintain the convolutions of the two wires in substantial alinement lengthwise of the fabric and thereby to maintain in alinement the edges of the sections of fabric that are so joined.

Figure 1:
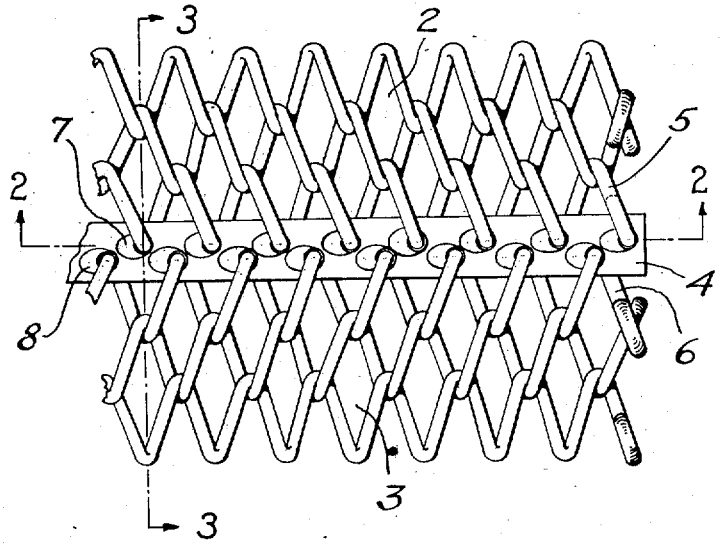
Fig. 1 is a plan view of a connecting member constructed in accordance with my invention, showing portions of adjacent woven wire sections which are connected thereby.

In the drawing, the numeral 2 indicates part of a section of wire fabric composed of wires having right-hand twist, and the numeral 3 indicates part of a section composed of wires having left-hand twist. A connecting or splice bar 4 joins the end wires 5 and 6 of the sections 2 and 3. For this purpose, the bar 4 is provided with openings arranged in two longitudinal series 7 and 8. These openings are preferably parallel and are inclined to interengage properly with the loops of the adjacent wires. The openings 7 and 8 are staggered with respect to one another, as shown in Fig. 1, so that the several loops of the wires 5 and 6 are in substantial alinement lengthwise of the fabric.

Figure 2:
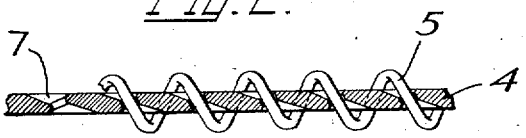
Fig. 2 is a longitudinal sectional view taken on the line 2—2 in Fig. 1.
Figure 3:
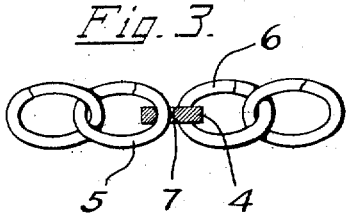
Fig. 3 is a transverse sectional view taken on the line 3—3 in Fig. 1.

Fig. 2 shows the manner in which the openings may be drilled in the bar 4. The inclination of these openings from the vertical forms a good bearing for the portions of the wires which pass through the openings 7 and 8. It is preferred that the openings 7 and 8 be countersunk on both sides of the bar, as shown in Fig. 2, in order that the openings may adapt themselves readily to the curved surfaces of the wires.

In connecting sections of woven wire fabric by means of the splice bar described above, I prefer to employ the method described in the patent of John C. Anderson, granted Nov. 13, 1928, No. 1,691,507, whereby the sections to be joined are laid on opposite sides of the connector, which in this instance is the splice bar 4, then on one side there is screwed into the right-hand woven section, and into the adjacent series of openings 7, a helical wire of right-hand twist exactly like the other right-hand wires composing this section. By a similar operation, the left-hand wound section is joined to the connecting bar, and the ends of the connecting wires are bent over in the same manner as the ends of the other wires composing the fabric.

The connecting bar described above has advantages over previously known methods of connecting sections or panels of woven wire fabric, such as bent wires or straight wires thrust through overlapping convolutions of the end wires of the fabric. Among these advantages are that the rigid bar holds the convolutions of the fabric in accurate alignment, both lengthwise of the bar and in a direction laterally with respect to the bar. In other words, the panels of fabric are positively maintained at their full width and their ends are not allowed to crumple into one another. Also, it is to be noted that the bar connectors are of no greater thickness than the adjacent convolutions of the woven wire fabric, so that when a conveyor belt is made up of woven wire sections connected by such bars, the conveyor is readily able to pass between driving rolls without being obstructed or interfered with by the connecting bars.

Modifications may be made in the construction herein shown and described, within the scope of the appended claims.

I claim as my invention:

1. A connector for joining a wire wound in right-hand convolutions to a wire wound in left-hand convolutions, comprising a member having a series of openings for engaging the convolutions of the right-hand woven wire and also having another series of openings for engaging the convolutions of the left-hand woven wire.

2. A connector for joining a wire wound in right-hand convolutions to a wire wound in left-hand convolutions, comprising a bar having two longitudinal series of openings, one series for engaging the right-hand woven wire and the other for engaging the left-hand woven wire, the openings of the two series being staggered with respect to one another, so as to maintain the convolutions of the two wires in substantial alinement in a direction perpendicular to said bar.

3. A connector for joining a wire wound in right-hand convolutions to a wire wound in left-hand convolutions, comprising a bar having a longitudinal series of openings inclined for engagement with convolutions of the right-hand helical wire and having another longitudinal series of similarly inclined openings for engagement with the convolutions of the left-hand helical wire.

4. A connector for joining a wire wound in right-hand convolutions to a wire wound in left-hand convolutions, comprising a bar having two longitudinal series of openings, the openings of one series extending obliquely through the bar for engagement with the convolutions of the right-hand helical wire, and the openings of the other series extending obliquely through the bar and parallel to the openings of the first-named series for engagement with the convolutions of the left-hand helical wire, the openings of the two series being staggered with respect to one another, so as to maintain the convolutions of the said wires in substantial alinement in a direction perpendicular to said bar.

5. A connector for joining a wire wound in right-hand convolutions to a wire wound in left-hand convolutions, comprising a bar having two longitudinal series of openings, the openings of one series extending obliquely through the bar for engagement with the convolutions of the right-hand helical wire, and the openings of the other series extending obliquely through the bar and parallel to the openings of the first-named series for engagement with the convolutions of the left-hand helical wire, the openings of the two series being staggered with respect to one another, so as to maintain the convolutions of the said wires in substantial alinement in a direction perpendicular to said bar, and the said openings being countersunk on both sides of the said bar.

6. A connector bar for joining a wire wound in right-hand convolutions to a wire wound in left-hand convolutions, comprising a flat integral bar pierced with a plurality of openings distributed longitudinally of the bar and adapted to receive convolutions of said wires and to position said wires both longitudinally and laterally with respect to said bar.

7. A connector bar for joining a wire wound in right-hand convolutions to a wire wound in left-hand convolutions, comprising a flat integral bar pierced with a plurality of openings distributed longitudinally of the bar and adapted to receive convolutions of said wires and to position said wires both longitudinally and laterally with respect to said bar, the said bar being not materially thicker than the thickness of said convolutions, so that a conveyor fabric made up of panels of such wires connected by such bars will pass between conveyor driving rolls without interference by said bars.

Signed at Hartford, Connecticut, this 28th day of April, 1930.

KARL E. PEILER.